(12) United States Patent
Jung et al.

(10) Patent No.: US 6,549,317 B1
(45) Date of Patent: Apr. 15, 2003

(54) APPARATUS FOR TRANSMITTING IMAGE SIGNALS

(75) Inventors: Won-seok Jung, Seongnam (KR); Hyun-kuk Shin, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/432,793

(22) Filed: Nov. 3, 1999

(30) Foreign Application Priority Data

Nov. 4, 1998 (KR) ............................................. 98-47125

(51) Int. Cl.$^7$ ...................... H04B 10/00; H04B 10/04; H04N 5/52
(52) U.S. Cl. ...................... 359/188; 359/158; 348/679
(58) Field of Search ................................. 359/158, 180, 359/188, 173; 348/679, 684, 678, 760, 769

(56) References Cited

U.S. PATENT DOCUMENTS

| 5,105,285 A | * | 4/1992 | Miyata ........................ 358/449 |
| 5,410,363 A | * | 4/1995 | Capen et al. ................. 348/679 |
| 6,118,479 A | * | 9/2000 | Maeda et al. ................. 348/192 |

FOREIGN PATENT DOCUMENTS

| EP | 0 578 416 A1 | 1/1994 | ........... G06F/13/38 |
| EP | 0 859 326 A2 | 8/1998 | ........... G06F/13/42 |
| EP | 1001346 A2 | * 5/2000 | ........... G06F/13/00 |
| JP | 61-199990 | 12/1986 | |

* cited by examiner

Primary Examiner—Leslie Pascal
Assistant Examiner—Dalzid Singh
(74) Attorney, Agent, or Firm—Sughrue Mion, PLLC

(57) ABSTRACT

An apparatus for transmitting over optical cables a red image signal, a green image signal, and a blue image signal output from a personal computer, a clock signal indicative of the starting points of data frames of the image signals, an enable signal indicative of scan and blank periods of the image signals, a vertical synchronization signal and a horizontal synchronization signal. The apparatus includes a reference signal generator, a parallel-to-serial converter and a light signal generator. The reference signal generator generates a reference signal having predetermined data when the blank period starts in accordance with the enable signal. The parallel-to-serial converter converts the reference signal corresponding to the blank period and the image signals corresponding to the scan periods into serial signals. The light signal generator converts the clock signal, the enable signal, the vertical synchronization signal, the horizontal synchronization signal and the serial signals output from the parallel-to-serial converter into light signals to then be incident into the optical cables.

7 Claims, 2 Drawing Sheets

APPARATUS FOR TRANSMITTING IMAGE SIGNALS

BACKGROUND OF THE INVENTION

1. Field of the Invention

The present invention relates to an apparatus for transmitting image signals, and more particularly, to an apparatus for transmitting an N-bit red image signal, an N-bit green image signal and an N-bit blue image signal output from a computer system, clock signals indicative of frames of the image signals, enable signals indicative of the scan period and/or blank period of the image signals, vertical synchronization signals, horizontal synchronization signals and the like over an optical cable.

2. Description of the Related Art

In transmitting image signals to a relatively distant location, the use of a conventional cable causes a voltage drop in a signal being transmitted due to line resistance of the cable. Thus, line drivers for compensating for the voltage drop are necessary. Also, in the case of transmitting a parallel image signal, since multiple channels are necessary, a large amount of materials for transmission cables are required. Accordingly, an apparatus of converting a parallel image signal into a serial image signal and transmitting the same over an optical cable has been proposed.

However, when an image signal is transmitted over an optical cable, skews in received signals may occur due to a difference in transmission speeds of the respective channels, which is because the individual properties of each emitter driving circuit, each received signal amplifying circuit, each emitting element or a receiving element are not homogeneous. If the level of the skew exceeds a predetermined value, the image of the received signal cannot be reproduced properly.

SUMMARY OF THE INVENTION

To solve the above problem, it is an object of the present invention to provide an apparatus for converting a parallel image signal into a serial image signal and transmitting the same over an optical cable, wherein a difference in transmission speeds of the respective channels of the optical cable can be corrected.

To achieve the above object, the present invention includes an apparatus for transmitting over optical cables a red image signal, a green image signal, and a blue image signal output from a personal computer, a clock signal indicative of the starting points of data frames of the image signals, an enable signal indicative of scan and blank periods of the image signals, a vertical synchronization signal and a horizontal synchronization signal. The apparatus includes a reference signal generator, a parallel-to-serial converter and a light signal generator. The reference signal generator generates a reference signal having predetermined data when the blank period starts in accordance with the enable signal. The parallel-to-serial converter converts the reference signal corresponding to the blank period and the image signals corresponding to the scan periods into serial signals. The light signal generator converts the clock signal, the enable signal, the vertical synchronization signal, the horizontal synchronization signal and the serial signals output from the parallel-to-serial converter into light signals to then be incident into the optical cables.

Accordingly, since the reference signal is transmitted during the blank period, it is possible to measure a time interval between a reception point of the reference signal and that of the clock signal during each blank period. In other words, since the phase of each image signal is adjusted during each scan period, the difference in transmission speeds of the respective channels can be corrected.

BRIEF DESCRIPTION OF THE DRAWINGS

The above objectives and advantages of the present invention will become more apparent by describing in detail a preferred embodiment thereof with reference to the attached drawings in which.

DESCRIPTION OF THE PREFERRED EMBODIMENTS

Figure 1:
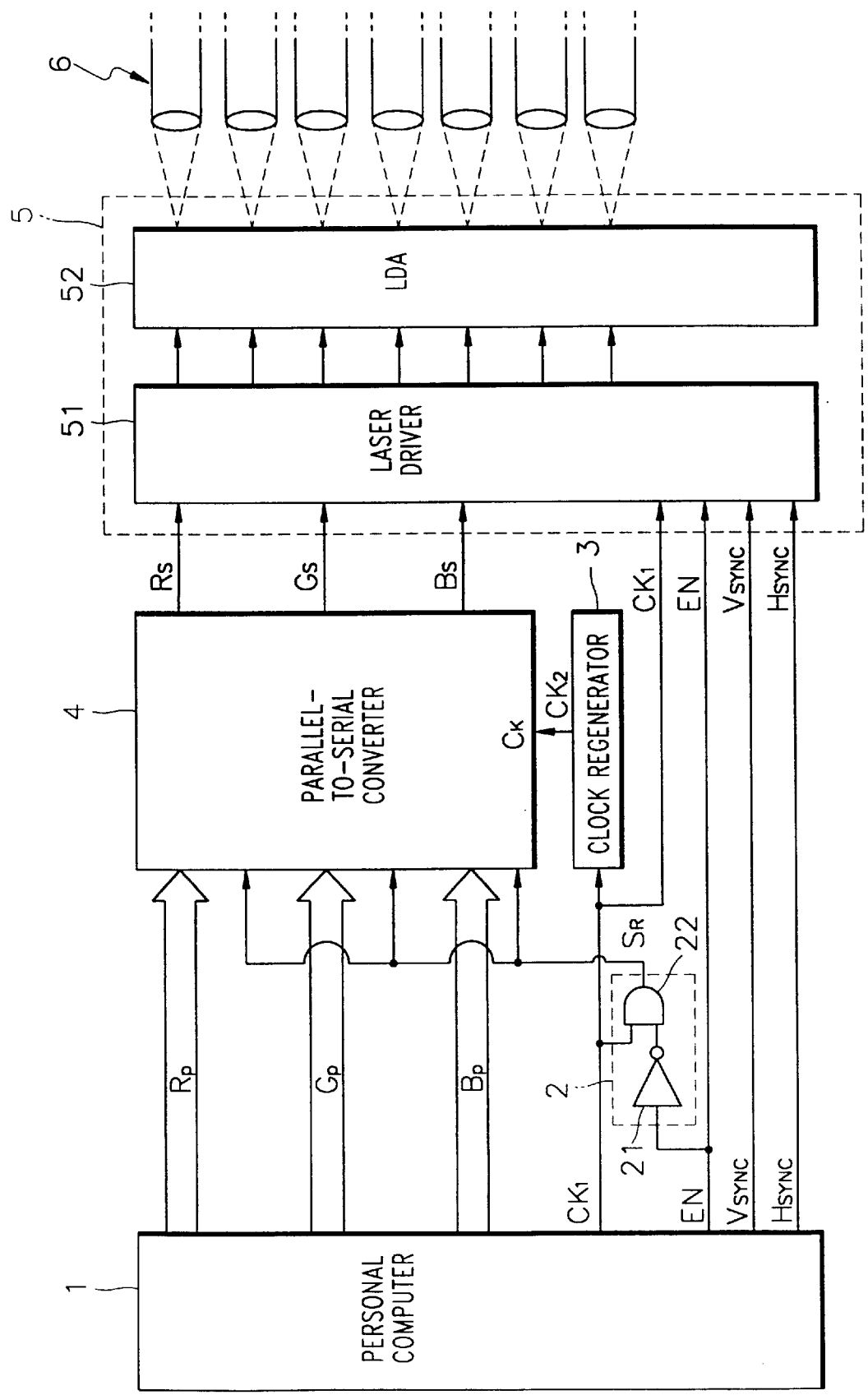
FIG. 1 is a block diagram illustrating an image signal transmitting apparatus according to a preferred embodiment of the present invention.
Figure 2:
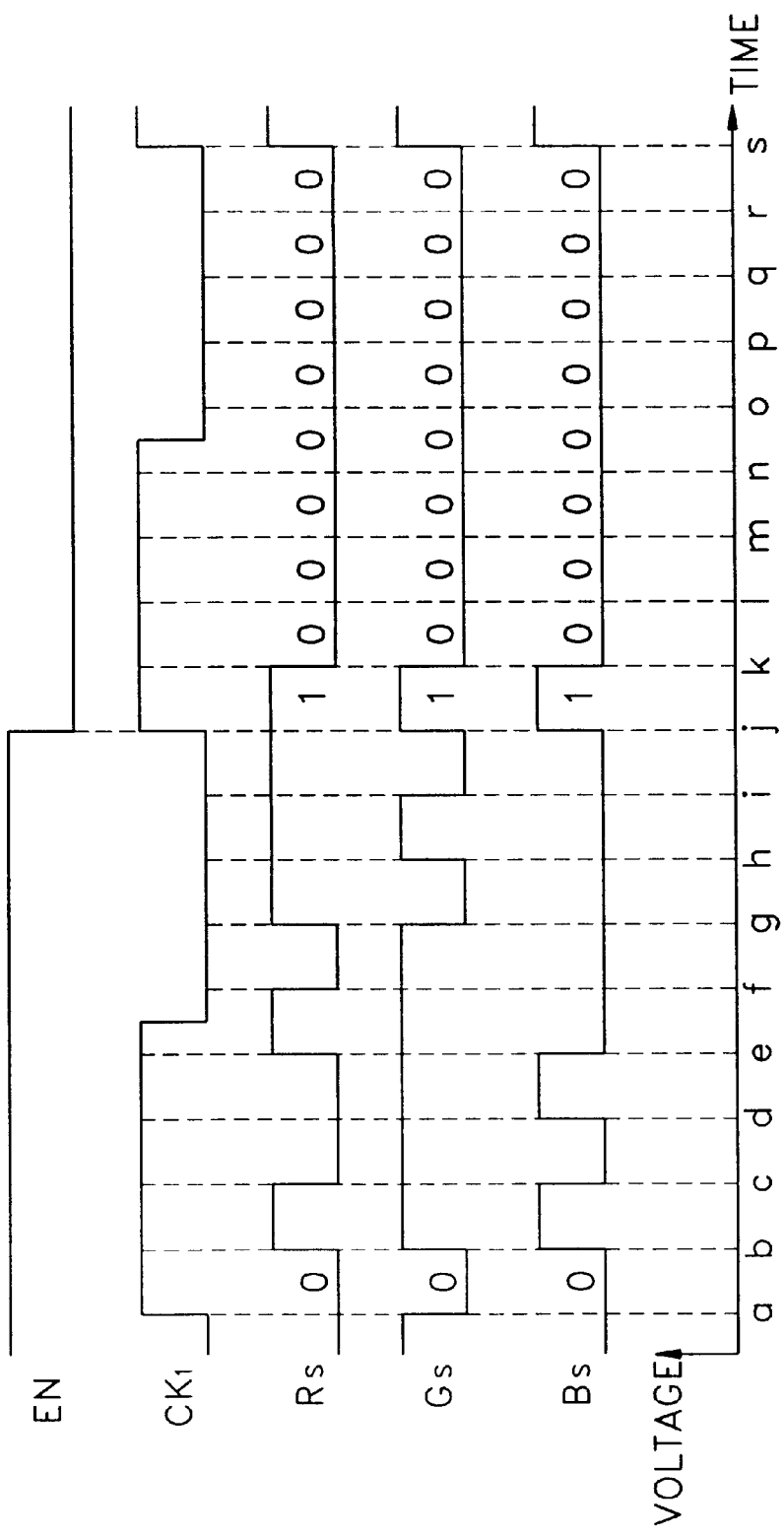
FIG. 2 is a timing diagram illustrating an example of signals input to a laser driver of the transmitting apparatus shown in FIG. 1.

Referring to FIGS. 1 and 2, the image signal transmitting apparatus according to the present invention includes a reference signal generator 2, a parallel-to-serial converter 4 and a light signal generator 5. The apparatus transmits over optical cables 6 an 8-bit red image signal $R_P$, an 8-bit green image signal $G_P$, and an 8-bit blue image signal $B_P$, which are output from a personal computer 1, a first clock signal $CK_1$, a vertical synchronization signal $V_{SYNC}$, a horizontal synchronization signal $H_{SYNC}$, and an enable signal EN. The first clock signal $CK_1$ indicates the starting points of data frames for parallel image signals $R_P$, $G_P$ and $B_P$. The enable signal EN notifies a reception side, for example, a monitor, of scan periods and blank periods of the parallel image signals $R_P$, $G_P$ and $B_P$.

The reference signal generator 2 includes an inverter 21 and an AND gate 22, and generates a reference signal $S_R$ having predetermined data when the blank period starts in accordance with the enable signal EN. The parallel-to-serial converter 4 converts the reference signal $S_R$ corresponding to the blank period and the parallel image signals $R_P$, $G_P$ and $B_P$ corresponding to the scan periods into serial signals.

The light signal generator 5 converts the first clock signal $CK_1$, the enable signal EN, the vertical synchronization signal $V_{SYNC}$, the horizontal synchronization signal $H_{SYNC}$ and the serial signals output from the parallel-to-serial converter 4 into light signals to then be incident into the optical cables 6.

For the signals output from the personal computer 1, the timing at which the first clock signal $CK_1$ is transited from a logic low state "0" to a logic high state "1" is the starting point of data frames of the parallel image signals $R_P$, $G_P$ and $B_P$. Also, the period in which the enable signal EN is at a logic high state is the scan period, and the period in which the enable signal EN is at a logic low state is the blank periods Thus, during the blank period, the respective parallel image signals $R_P$, $G_P$ and $B_P$ are maintained at logic low states.

The inverter 21 of the reference signal generator 2 outputs a logic high signal during the blank period. Thus, when the blank period starts in accordance with the enable signal EN, the AND gate 22 generates a reference signal corresponding to the pulse of the first clock signal $CK_1$ being at a logic high state. A clock regenerator 3 drives the parallel-to-serial converter 4 by a second clock signal $CK_2$ whose frequency is 9 times higher than that of the first clock signal $CK_1$.

The parallel-to-serial converter 4 converts the reference signal $S_R$ corresponding to the blank period and the parallel image signals $R_P$, $G_P$ and $B_P$ corresponding to the scan periods into serial signals. Accordingly, the respective signals output from the parallel-to-serial converter 4, that is, the respective serial image signals $R_S$, $G_S$ and $B_S$, generate 9-bit data frames for one period of the first clock signal $CK_1$. In the respective data frames, the first bit is allocated so as to correspond to the reference signal $S_R$ and the other 8 bits are allocated so as to correspond to the parallel image signals $R_P$, $G_P$ and $B_P$. Thus, during the scan period in which the enable signal EN is at a logic high state, the first bits of the respective data frames are always at logic low states (see a section a-b of FIG. 2). Conversely, during the blank period in which the enable signal EN is at a logic low state, the first bits of the respective data frames are always at logic high states (see a section j-k of FIG. 2). In other words, during the blank period, all data frames have specific data structure of "100000000". Therefore, in a receiving apparatus (not shown) which receives light signals from the optical cables 6, when the data of "100000000" is first detected during the blank period, the time interval between the starting point of the first bit and the timing point of a rising edge of the first clock signal $CK_1$ can be measured. In accordance with the measured time interval, the phases of the corresponding serial image signals $R_S$, $G_S$ and $B_S$ can be adjusted, thereby correcting a difference in transmission speeds of the respective channels.

The light signal generator 5 includes a laser driver 51 and a laser diode array (LDA) 52. The laser driver 51 generates driving signals corresponding to the serial image signals output from the parallel-to-serial converter 4, the first clock signal $CK_1$, the enable signal EN, the vertical synchronization signal $V_{SYNC}$ and the horizontal synchronization signal $H_{SYNC}$. The LDA 52 generates laser light signals by the driving signals of the laser driver 51. The light signals generated in the LDA 52 are incident into the corresponding optical cables 6 to then be transmitted to the receiving apparatus positioned at a monitor.

As described above, according to the present invention, the image signal transmitting apparatus converts parallel image signals into serial image signals and transmits the same over optical cables. Thus, a difference in transmission speeds of the respective channels of the optical cables can be corrected, thereby minimizing skew of received signals to thus maximize the reproducibility of images.

Various changes and modifications may be made by those skilled in the art which do not go beyond the spirit and scope of the invention as defined in the appended claims.

What is claimed is:

1. An apparatus for transmitting over optical cables a red image signal, a green image signal, and a blue image signal output from a personal computer, a clock signal indicative of the starting points of data frames of the image signals, an enable signal indicative of scan and blank periods of the image signals, a vertical synchronization signal and a horizontal synchronization signal, the apparatus comprising:

a reference signal generator for generating a reference signal having predetermined data when the blank period starts in accordance with the enable signal;

a parallel-to-serial converter for converting the reference signal corresponding to the blank period and the image signals corresponding to the scan periods into serial signals; and a light signal generator for converting the clock signal, the enable signal, the vertical synchronization signal, the horizontal synchronization signal and the serial signals output from the parallel-to-serial converter into light signals to then be incident into the optical cables.

2. The apparatus of claim 1, wherein said reference signal generator further comprises an inverter and an AND gate.

3. The apparatus of claim 1, wherein said light signal generator further comprises a laser driver and a laser diode array.

4. The apparatus of claim 1, wherein doing the blank periods the red image signal, the green image signal and the blue image signals are respectively maintained at logic low states.

5. The apparatus of claim 1, wherein the parallel-to-serial convertor generates a 9-bit data frame for each period of the clock signal.

6. The apparatus of claim 5 wherein a first bit is allocated to the reference signal and eight bits are allocated to said red image signal, blue image signal and green image signals.

7. A method of transmitting a red image signal, a blue image signal and a green image signal, said signals being output from a PC, said method comprising:

(a) using a clock signal to indicate a starting point of data frames corresponding to said red, blue and green image signals;

(b) using an enable signal to indicate a scan and a blank period corresponding to the image signals;

(c) generating a reference signal having a predetermined data when the blank period starts in accordance with the enable signal;

(d) converting the reference signal corresponding to the blank period and the image signals corresponding to the scan period from parallel signals into serial signals; and (e) converting the clock signal, the enable signal and the serial signals along with a horizontal synchronization signal and a vertical synchronization signal to be incident into optical cables.

* * * * *